(12) United States Patent
Nuettgens et al.

(10) Patent No.: US 8,516,851 B2
(45) Date of Patent: Aug. 27, 2013

(54) METHOD FOR PRODUCING GLASS OR GLASS CERAMIC AND IN PARTICULAR GLASS OR GLASS CERAMIC ARTICLE

(75) Inventors: Sybill Nuettgens, Frankfurt (DE);
Wolfgang Schmidbauer, Mainz (DE);
Roland Dudek, Bad Kreuznach (DE);
Friedrich Georg Schroeder, Ingelheim (DE); Gerhard Hahn, Allenfeld (DE);
Markus Borrmann, Mainz (DE); Helga Goetz, Heidesheim (DE)

(73) Assignee: Schott AG (DE)

( * ) Notice: Subject to any disclaimer, the term of this patent is extended or adjusted under 35 U.S.C. 154(b) by 801 days.

(21) Appl. No.: 11/720,915

(22) PCT Filed: Dec. 9, 2005

(86) PCT No.: PCT/EP2005/013245
§ 371 (c)(1),
(2), (4) Date: Feb. 4, 2009

(87) PCT Pub. No.: WO2006/061243
PCT Pub. Date: Jun. 15, 2006

(65) Prior Publication Data
US 2009/0155533 A1 Jun. 18, 2009

(30) Foreign Application Priority Data
Dec. 11, 2004 (DE) .......................... 10 2004 059 728

(51) Int. Cl.
*C03B 40/04* (2006.01)
*C03B 32/02* (2006.01)

(52) U.S. Cl.
USPC ............................................ 65/25.1; 65/33.1

(58) Field of Classification Search
USPC ................ 65/25.1, 25.2, 25.4, 33.1, 33.2
See application file for complete search history.

(56) References Cited

U.S. PATENT DOCUMENTS 3,150,948 A * 9/1964 Gladieux et al. ............... 65/25.2
3,395,943 A * 8/1968 Wilde et al. ..................... 406/88

(Continued)

FOREIGN PATENT DOCUMENTS

DE 199 06 963 C1 6/2000
DE 10045479 A1 4/2002

(Continued)

OTHER PUBLICATIONS

Masuyama, J., "JP Application No. 2007-544833 Office Action Jan. 30, 2012",, Publisher: JPO, Published in: JP.

*Primary Examiner* — Joseph S Del Sole
*Assistant Examiner* — Erin Snelting
(74) *Attorney, Agent, or Firm* — Kaplan Breyer Schwarz & Ottesen, LLP (57) ABSTRACT

In order to obtain glass or glass ceramic materials having increased strength, the invention provides a method for producing glass or glass ceramic articles, which comprises the steps:
producing an initial glass body (11),
mounting the initial glass body (11) on a gas cushion (13) between a levitation support (1) and the initial glass body (11), and
at least partially ceramizing the initial glass body (11) on the levitation support (1).
The levitation support comprises at least one continuous surface region (3) having at least one gas feed region (151, 152, 153) where levitation gas for the gas cushion (13) is fed out from the levitation support, and at least one gas discharge region (171 172, 173) where gas from the gas cushion (13) is at least partially discharged into the levitation support.

22 Claims, 3 Drawing Sheets

(56) References Cited

U.S. PATENT DOCUMENTS

| | | | |
|---|---|---|---|
| 3,526,491 A | 9/1970 | Sharrock | |
| 3,554,725 A * | 1/1971 | Bracken et al. | 65/185 |
| 3,607,198 A | 9/1971 | Meunier et al. | |
| 3,809,542 A | 5/1974 | Lythgoe et al. | |
| 3,841,856 A | 10/1974 | Bondarev et al. | |
| 4,059,426 A * | 11/1977 | Starr | 65/25.2 |
| 4,200,446 A | 4/1980 | Koontz | |
| 5,078,775 A | 1/1992 | Maltby, Jr. et al. | |
| 5,290,999 A * | 3/1994 | Kuster et al. | 219/388 |
| 6,515,263 B2 | 2/2003 | Mitra et al. | |
| 6,781,684 B1 | 8/2004 | Ekhoff | |
| 7,107,792 B2 | 9/2006 | Langsdorf et al. | |
| 2002/0026932 A1 | 3/2002 | Mitra et al. | |
| 2002/0092325 A1 * | 7/2002 | Muschik et al. | 65/134.3 |
| 2002/0096649 A1 | 7/2002 | Hahn et al. | |
| 2003/0177790 A1 * | 9/2003 | Langsdorf et al. | 65/25.2 |
| 2005/0042070 A1 * | 2/2005 | Ikehata et al. | 414/676 |

FOREIGN PATENT DOCUMENTS

| | | |
|---|---|---|
| DE | 101 45 686 A1 | 4/2003 |
| DE | 101 51 086 C1 | 6/2003 |
| EP | 1 170 264 A1 | 1/2002 |
| EP | 1 322 562 B1 | 7/2003 |

\* cited by examiner

METHOD FOR PRODUCING GLASS OR GLASS CERAMIC AND IN PARTICULAR GLASS OR GLASS CERAMIC ARTICLE

The invention relates in general to the production of glass or glass ceramics and in particular to the production of glass or glass ceramics by mounting on a gas bed during ceramization, as well as to glass or glass ceramic articles produced according to the method.

Glass ceramic plates are employed inter alia extensively as cooking surfaces for modern hobs, as oven windowpanes or fireproof glazing. With glass ceramics, the strength and surface condition plays an essential role for their fields of use.

Glass ceramics used for hobs currently often have a knopped underside structure, in order to increase the strength of the glass ceramic plates for hob applications.

In particular, the knops provide protection of the underside of the ceramic plate against strength-reducing damage, which is incurred especially during the process of ceramizing the glass ceramic.

The strength is finally achieved by the knops absorbing damage to the lower sides.

A disadvantage with such knopped glass ceramic plates, however, is inter alia the scattering of light which is sent through the glass ceramic plate. It is therefore impossible, or possible only with difficulty, for displays or structures below the glass ceramic plate to be made visible without distortion.

In the past, glass ceramic hob surfaces which have smooth surfaces on both sides have also been produced for hobs. With a plate thickness of 4 mm, an average strength value of 36 cm fall height was achieved in a test format of 10×10 cm.

In modern ceramizing methods, strengths of up to 50 cm fall height are achieved for 4 mm thick glass ceramic plates smooth on both sides. Such glass ceramic hob surfaces smooth on both sides with a sufficient strength have previously been obtained by re-polishing the glass ceramic plates. This process cannot be carried out economically for industrial production.

For the application of glass ceramic plates for stove and oven windowpanes, it is likewise necessary on the one hand to achieve a certain strength. On the other hand, the surfaces of the glass ceramic should be free of damage, since damage to the surface impairs the optical transmission and the esthetic impression. Damage furthermore constitutes potential sites where the glass can easily break by impact.

The glass ceramic plates currently used primarily comprise damage due to the ceramization process, which has a visually perturbing effect and significantly reduces the strength.

The strength properties are determined by the quality of the surface. In a known ceramization process, a green glass plate to be ceramized is placed on a ceramic support plate, in which case separating means may be used between the green glass plate and the support plate. In this case, the glass ceramics which have been ceramized on a support generally comprise damage on the side that faces the support plate.

Another method uses suspended ceramization. In this method, the green glass plate is mounted in suspension at one end. Although the glass ceramic is mounted contact-free in suspended ceramization, so that no damage can occur on a support, it is nevertheless difficult to achieve a planarity of the ceramic glass plates that meets requirements. Furthermore, the entire area of the glass ceramics ceramized in suspension cannot be utilized, since the plates become damaged in the region of the suspension points.

Another way of producing high-strength glass ceramics is provided by chemically prestressing the article after ceramization. In this regard, see patent specification DE 1803540. A disadvantage with this method, however, is that a further process step is necessary in which the glass ceramic article additionally needs to be heated. The chemical prestressing method can furthermore be applied only, as indicated in the patent specification, to very particular compositions.

It is known from GB 1383202 to mount a plate to be ceramized on a gas cushion between a support and the plate. To this end, the support comprises perforated tiles, through which the gas for the gas cushion is delivered. The gas delivered through the perforated tiles flows between the plate and the support to the edge of the plate, where it finally escapes. The effect of this arrangement, however, is that only comparatively small glass plates can be ceramized. For large glass plates, the pressure which is created under the glass plate is too great, so that curvature of the plate takes place.

Furthermore, GB 1383202 proposes to use combustion gas as a levitation gas for the gas cushion. This, however, is disadvantageous for the properties of the glass ceramic, since the combustion gases on the one hand contain particles which are preferentially deposited on the glass ceramic and therefore lead to a strength reduction. Likewise, readily scaling metals and combustion products in the oven space likewise lead to the glass plate being contaminated on its surface.

DE 10045479 describes a method for the contactless mounting and transporting of flat glass, which likewise involves mounting on a gas cushion. To this end the support has a segmented structure, in which the gas is supplied through openings in the segments and can escape again through the gaps between the segments.

U.S. Pat. No. 5,078,775 describes a gas cushion support with a diaphragm, the upper side of which has slotted gas feed and gas outlet openings. The gas outlet openings are in communication with gas outlet chambers in the diaphragm. The gas feed openings are connected via manifold shafts to the lower side of the diaphragm. On the lower side of the diaphragm, compressed gas is supplied which flows through the manifold shafts and the gas feed openings to the upper side, where it generates a gas cushion on which a glass plate can then be mounted. With such an arrangement in which the feed gas is supplied perpendicularly to the upper side, however, the gas comes only comparatively briefly in contact with the walls of the manifold containers, so that full heat exchange does not take place and the gas can therefore flow into the gas cushion at a temperature which may differ from the temperature of the diaphragm and in particular the temperature of the supported glass.

It is an object of the invention to provide glass or glass ceramic materials, which in particular have a smooth fire-polished and/or knopped surface, the materials having a significantly increased strength compared with known glass ceramics together with less optically perturbing damage of the surface.

This object is directly achieved in a very surprisingly simple way by a method for producing a glass or glass ceramic article as well as a glass or glass ceramic article according to the independent claims. Advantageous refinements are the subject-matter of the dependent claims.

Accordingly, the method according to the invention comprises
  producing an initial glass body,
  mounting the initial glass body on a gas cushion between a levitation support and the initial glass body, and
  at least partially ceramizing the initial glass body on the levitation support. The levitation support has at least one continuous surface region with at least one gas feed region where levitation gas for the gas cushion is fed out from the levitation support, and at least one gas discharge region where gas from the gas cushion is at least partially discharged into the levitation support.

In contrast to the device disclosed in U.S. Pat. No. 5,078,775, in which the gas is applied via manifold shafts through the diaphragm, according to the invention the gas which is supplied to the gas cushion is preferably also delivered through one or more chambers arranged in the levitation support, before it emerges therefrom. In this way, in conjunction with the gas discharge chamber or chambers, not only a particularly homogeneous pressure distribution but also good temperature equilibration is achieved. Owing to the residence time of the gas in the gas feed, its temperature is matched better to the temperature of the diaphragm and of the mounted glass plate or glass ceramic plate. This arrangement and procedure according to the invention for mounting the glass or the glass ceramic helps to achieve a very uniform temperature distribution along the mounted plate. This also leads in a surprisingly simple way to an increased strength of glass ceramic plates which are mounted according to the invention during the ceramization.

For effective heat transfer between the levitation gas flowing out of the diaphragm and that flowing into it, it is advantageous for the at least one gas feed chamber and at least one gas discharge chamber to comprise closed channels, which extend in the direction along the bearing surface inside the diaphragm. The term closed channel is accordingly intended to mean a channel which is bounded by a wall in the manner of a tube. The channels may in particular be configured so that they are closed or at least partially closed from the bottom surface of the levitation support, which lies opposite the bearing surface. A closed channel in the context of the invention does not mean a fully sealed cavity, however, since at least one inlet opening for the gas feed chamber and one outlet opening for the gas discharge chamber are provided for the feed and discharge from the chambers or respectively to the chambers of this embodiment.

The gas feed chamber may advantageously have a gas inlet opening and the gas discharge chamber a gas outlet opening, which are arranged so that the gas flow direction inside the gas feed chamber and the gas discharge chamber extends transversely to the normal of the bearing surface, and in particular along the bearing surface. If the levitation gas in the gas feed chamber and the gas discharge chamber in the diaphragm flows transversely to the normal of the bearing surface, particularly in the direction along the bearing surface, then a long flow path of the gas in the chambers and concomitantly also effective heat transfer to the chamber walls can be achieved even in a thin diaphragm as the levitation support.

According to yet another preferred embodiment of the invention, the levitation gas is fed into the gas feed chamber through at least one gas-permeable connection on the lower side of the diaphragm, or the levitation support. An antechamber, preferably with a ceramic wall, arranged below the gas feed and gas discharge chambers, may then be provided which is connected via at least one gas-permeable connection to the gas feed chamber in order to feed gas into the gas feed chamber. It would also be conceivable for the antechamber itself to be a component of the diaphragm or levitation support, or to use an integral diaphragm having at least one antechamber, gas feed chamber and gas discharge chamber. In each case, the gas feed chamber is at least partially closed at the bottom, the levitation gas being introduced into the gas feed chamber by a downwardly directed gas-permeable connection in the diaphragm into the gas feed chamber. Although the gas is also supplied from below, for example in the gas cushion support known from U.S. Pat. No. 5,078,775, this diaphragm does not however have chambers or channels for the gas feed which are closed or at least partially closed at the bottom. Rather, the channels are entirely open at the bottom. In contrast to this, the effect achieved by the gas feed chamber with a gas-permeable connection, particularly in the form of channels with a small cross section as the gas feed chamber, is that the gas resides for a longer time in the gas feed chamber before it emerges from the bearing surface via the further gas-permeable connection. In this embodiment of the invention as well, improved heat exchange with the diaphragm and therefore particularly good temperature homogeneity in the gas cushion are therefore achieved. In particular, with a device according to the invention, the temperature of the levitation cushion can be kept with a temperature gradient of less than 10° C., preferably less than 5° C. in the direction along the bearing surface by means of the diaphragm with chambers for gas feed and gas discharge. Likewise conceivable, albeit somewhat more elaborate, is a reversed configuration in which it is not the gas feed chambers but the gas discharge chambers that are correspondingly attached to an antechamber by means of a downwardly directed gas-permeable connection, so that the gas from the levitation cushion travels via the gas discharge chambers into the antechamber and is discharged there.

The pressure drop in the chambers is preferably at most 0.5 mbar. If the levitation gas experiences a pressure drop of at most 0.5 mbar when flowing through the gas feed chamber and/or the gas discharge chamber, then a particularly homogeneous pressure distribution can also be achieved in the gas cushion.

The initial glass body may be produced by a conventional melting and shaping process, before the initial glass body is then ceramized according to the invention for example in a levitation oven.

The least partial ceramization may in particular also comprise nucleation. It is important to mount the glass or the glass ceramic on a levitation cushion on the one hand whenever the glass or the glass ceramic becomes very soft and/or whenever the glass or glass ceramic plate expands or contracts strongly. In the conventional ceramization process, the latter leads to a relative movement between the glass plate and the support plate, the effect of which is that scratches are formed on the more sensitive glass plate. For ceramization, the glass is initially brought to a nucleation temperature. This nucleation temperature lies at a temperature for which the glass plate reaches viscosities in the region of from $\varsigma=10^{10}$ dpas. It is therefore precisely during this phase that mounting on a maximally homogeneous pressure profile is favorable for the properties, in particular planarity and strength, of the article finally produced.

It is furthermore advantageous for the glass to have no contact with the support at said viscosities. If contact of the initial glass body with a support takes place, then adhesion of the glass to the support may occur.

During the ceramization process, this nucleation phase is followed by a crystal growth phase.

By the method according to the invention, a particularly homogeneous temperature profile can also be achieved both along the surface of the initial glass body and between the upper and lower sides of the body, since there is no longer any contact with the support. The support otherwise represents a heat reservoir which can adapt only slowly and inhomogeneously to the temperature changes occurring during the ceramization.

Particularly during the crystal formation of phase, the temperature homogeneity is important for the future quality and strength of the ceramized glass, so that levitational mounting is particularly advantageous here.

The crystal growth may furthermore take place very rapidly with a particular temperature adjustment. Because of this, so much heat is released inside the glass plate that the initial glass body become substantially softer and viscosities of ç=$10^8$ dPas or less are reached. Even at such low viscosities, damage-free processing is possible with levitational mounting according to the invention on a gas consumed.

The least partial ceramization also need not comprise full ceramization. For example, the material of the initial glass may be only semi-ceramized in order to obtain desired physical properties of the article finally produced.

In the course of the ceramization process, the glass plate may change in its geometrical dimensions. This effect often occurs, for example, because of the phase transition during ceramization. This may involve both shrinkage and expansion of the glass plate. These changes often occur both in the nucleation range and in various phases of the crystal growth.

In the conventional ceramization method, a strong relative movement of the glass plate relative to the support plate occurs in these phases, which may lead to scratches in the product. According to an advantageous refinements of the method according to the invention, therefore, the glass plate or the initial glass body is mounted levitating on the glass cushion while it shrinks or expands.

By mounting on a levitation support with a continuous surface, which comprises regions in which gas is supplied and discharged, a previously unachieved homogeneous pressure distribution is achieved under the initial glass body. This leads to particularly little deformation or even no longer any deformation of the initial glass, even though it generally becomes very soft during the ceramization, in which case viscosities of $10^8$ dPas or even lower may be reached. Owing to the homogeneous pressure distribution, furthermore, essentially no tensile or compressive stresses occur any longer during the ceramization. Concomitantly with a homogeneous pressure distribution, a particularly homogeneous pressure distribution in the initial glass can furthermore be achieved by the method according to the invention during the ceramization. The substantially larger pressure gradients otherwise occurring under the material in known methods lead to gas flows extending laterally in the direction of the gradients. If the temperature of the gas does not correspond accurately to the temperature of the initial glass, then heat will be dissipated or supplied via the locally differing gas flows. A homogeneous temperature distribution under and over the initial glass, however, is important for the ceramization in the initial glass and the planarity. In particular, temperature differences even in the range of a few degrees can lead to curvature of the glass.

It is furthermore advantageous for the levitation gas to be at least partially recirculated. In this way, a circuit of the levitation gas is achieved. This is advantageous particularly when the glass or the glass ceramic is mounted in the hot state on the gas cushion, for example for ceramization. The recirculated gas is thus already heated when it enters the gas feed chambers, so that the levitation support is cooled only little by the supplied levitation gas. This on the one hand saves energy, and on the other hand the homogeneity of the temperature distribution is perturbed little or not at all. For temperature differences which are as small as possible, it is furthermore advantageous for the levitation gas to be taken from the environment of the initial glass body, for example the oven space of a ceramizing oven, in which the levitation support is arranged.

Compared with an article produced by suspended separation, a glass or glass ceramic article produced according to the invention is furthermore distinguished by a planer surface. With suspended ceramization, in the softened state of the initial glass body, flow of the material can take place in the gravitational direction i.e. along the surface of the initial glass body, which leads to a significantly inhomogeneous thickness of the finally ceramized article. Restoring forces in the event of curvatures, with a ceramized initial glass body lying according to the invention on a plane support, are also much higher than with an initial glass body mounted in suspension. In the ceramization according to the invention, the surface of the initial glass body matches the surface of the support, so that undesired curvatures are compensated for. This effect does not occur with a freely suspended body, however, so that curvatures may remain.

According to one embodiment of the invention, surface-wide ceramization of the initial glass body is carried out so that a glass wall glass ceramic article ceramized surface-wide is obtained. This is possible owing to the levitational support, since no or only minimal holding or guiding is necessary in order to hold or guide the initial glass body. Conversely, for example in suspended ceramization, no ceramization can be carried out in the holding region since the material there becomes too soft or significant damage occurs.

Devices which are suitable for carrying out the method according to the invention, i.e. for producing glass or glass ceramic articles according to the invention, are also described in the Applicant's German application filed on the same day as the present invention with the title "Method and Device for the Contactless Transport or Support of Glass or Glass Ceramic", the disclosure of which is also fully incorporated in the subject-matter of the present invention.

The production of the initial or preliminary glass body may advantageously also comprise the separation of sections from an initial glass web. The separated sections may then be ceramized separately. This avoids subsequent coating of the ceramized material, which may cause damage reducing strength in the glass ceramic.

Conversely, the crystallization process in the initial glass is not perturbed by the method according to the invention. This correspondingly leads to a glass ceramic, or a glass or glass ceramic article producible by the method according to the invention, having novel and surprising properties. A glass or glass ceramic article, which is producible by the method according to the invention, is intended to mean an article having a material which may comprise glass and/or in particular glass ceramic and/or semi-ceramized glass.

The glass ceramic articles producible according to the invention, have an increased strength without chemical prestressing, so that prestressing is obviated according to one embodiment of the invention chemical, i.e. the a glass ceramic article according to the invention is not chemically prestressed therein.

In order to characterize the strength of the glass or glass ceramic articles produced according to the invention, standardized dropping tests may be carried out as a strength measurement. In this case the plate to be tested is cut into samples with a defined format (100 mm×100 mm) or produced in this defined format, and tested by means of a ball dropping test. The ball dropping test is carried out by letting a steel ball with a defined mass (m=200 g) and a defined diameter (Ø 36 mm) for a freely onto the center of the sample from an initial height. If the sample survives this fall without breaking, then the fall is repeated with an increased fall height. This iterative method, with a fall height respectively increased in a defined way, is carried out until breaking of the sample occurs. The fall height at which breaking occurs is taken as a measure of the strength of this sample. The strength of the entire plate to be tested, or a batch of produced articles, is given by the average value of the individual strengths of the samples cut from it.

Owing to the production method, and article producible according to the invention thus in particular has a significantly increased breaking strength compared with known glass ceramic materials, which is manifested by a correspondingly increased average fall height in the test described above. This increased strength is already exhibited by glass ceramic articles which are not additionally prestressed, in particular without chemical prestressing. The glass or glass ceramic articles according to the invention are thus distinguished by an average breaking fall height which is at least 15 cm per millimeter thickness of the glass or glass ceramic article with a format of 10×10 cm. An average breaking fall height of 18 cm per millimeter thickness of the glass or glass ceramic article is also readily achieved or exceeded. These values were verified particularly in a thickness range of between 3 and 5 millimeters of the material of the article, but also apply for other material thicknesses above and below this range since there is an essentially linear relation between breaking strength and average breaking fall height.

According to initial discoveries, the increased strength of the glass ceramic articles producible according to the invention is due inter alia to a vitreous film forming on the surface of the article.

In general 20 cm per millimeter thickness, or even at least an 25 cm average breaking fall height per millimeter thickness of the ceramic article are also achieved. Furthermore, and even average breaking fall heights of 30 or more centimeters per millimeter of plate thickness are achievable by optimizing the production parameters.

These advantageous strength properties of the glass ceramic articles producible according to the invention make it possible to reduce the thickness for an equal strength compared with conventionally produced articles, which inter alia lowers the material costs and therefore the price of such articles.

The linear relation between plate thickness and breaking fall height applies so long as the glass plate has sufficient opportunity to absorb the impact of the ball by bending. In the case of particularly thick glass plates, however, the plate may break earlier. A departure from the linear relation may take place for thick glass plates in the range beyond about 10 mm thickness, in which case the gradient of the average value of the fall height then generally decreases with an increasing plate thickness.

The linear relationship of the breaking fall height and the plate thickness, which applies in wide ranges, is known inter alia from J. L. Glathart, F. W. Preston: "The behaviour of glass under impact"; in: Glass Technology, 1968.

A glass or glass ceramic article producible according to the invention may in particular comprise a material that is breakproof with a fall height of more than 45 centimeters in the form of a 3 millimeter thick plate plane on both sides with the format 10×10 cm. In general, breaking fall heights of at least 60 cm are even achieved.

In particular, it is also possible to produce a glass or glass ceramic article according to the invention so that its material is breakproof on average with a fall height of at least 80 centimeters in the form of a 3 millimeter thick plate plane on both sides.

According to another embodiment of the glass or glass ceramic article according to the invention, it comprises a material that is breakproof on average with a fall height of at least 140 centimeters in the form of a 5 millimeter thick plate plane on both sides. This surpasses the strength of known glass ceramic articles without chemical stressing, measured from the fall height, by more than a factor of 2.

The values specified above relate to material with a particular shape and thickness. This does not generally mean that the glass or glass ceramic article per se must have a format of 10×10 centimeters, rather that a test body cut with the respectively indicated thicknesses from the glass or glass ceramic article has said average breaking fall heights. A glass or glass ceramic article according to the invention may accordingly have many other shapes and also other thicknesses.

The specifications regarding strength serve in particular to characterize the material of the article, but not its shape and thickness. If an article according to the invention has a shape which is not plate-like or a different thickness, then, in order to determine its mechanical properties by a dropping test, one or more plates with a defined thickness may be produced and ceramized according to the invention from the same initial glass in order to carry out the dropping test. For example, strength values may be obtained in a simple way for various plate thicknesses by interpolating the values specified above. According to one embodiment of the invention, the article according to the invention therefore comprises a material that is breakproof on average with a fall height of at least x centimeters at least 60 centimeters in the form of a thick plate plane on both sides with the format 10×10 cm and with a thickness in the range of from 3 to 5 millimeters in a steel ball dropping test with a steel ball of mass 200 g, where x is given by the interpolation relation: $x = (140 \text{ cm} - 45 \text{ cm})/2 \text{ mm}^* $ (plate thickness in mm−3 mm)+45 cm.

According to one embodiment of the method according to the invention, a preliminary glass body is produced in the form of a glass plate plane on both sides, for example with a thickness of 3 or 5 millimeters, and subsequently at least partially ceramized levitationally, so that a corresponding glass or glass ceramic articles move on both sides is obtained. Such articles are suitable for example as a glass ceramic hotplate, a stop windowpane, as flameproof or fireproof panes. The levitationally carried out ceramization process according to the invention provides a fire-polished surface of the article. Compared with a surface subsequently polished mechanically, the fire-polished surface has substantially less or even known surface damage, which also leads to an increased strength of the article according to the invention compared with such subsequently polished plates. Glass or glass ceramic articles producible according to the invention may therefore be used as security glazing. Such security glazing may in particular be armored glass, or even bulletproof glass.

Knopped plates, as are often manufactured to date in order to achieve sufficiently high breaking safety, may also be produced and levitationally ceramized die the method according to the invention. To this end, a corresponding preliminary or initial glass body is produced particularly in the form of a glass plate knopped on one side. For this embodiment of the method according to the invention, a somewhat higher gas flow with a constant floating height is generally needed when the knops lie on the side facing the diaphragm. The knopped structure may, for example, be impressed in a melting and shaping process via a knopped roller during molding in one side of a preliminary glass web, in particular the lower side of the glass web. The knop structure may have a regular pattern of pimples, which are round or oval, or other projections.

Such a glass or glass ceramic article producible according to the invention, which corresponds in its external shape to a conventionally produced knopped plate, also has a breaking safety increased by at least 20% compared with such a conventionally produced knopped plate.

A glass or glass ceramic article according to the invention advantageously comprises a material of at least one of the systems $SiO_2$—$Al_2O_3$—$Li_2O$, $SiO_2$—$Al_2O_3$—$MgO$, $SiO_2$—$Al_2O_3$—$BaO$.

The material may furthermore comprise at least one of the oxides $TiO_2$, $ZrO_2$, $P_2O_5$ in a conventional concentration, in order to influence the mechanical and optical properties and the viscosity of the initial glass.

The production of an initial glass body may advantageously comprise fining of the initial glass. An essentially bubble-free initial glass is obtained by the fining, which makes a considerable contribution to the strength of the articles according to the invention. To this end the initial glass may be supplemented with fining agents such as $As_2O_3$, $Sb_2O_3$, $CeO_2$ or $SnO_2$, which are therefore also found in the material of the article finally produced.

Particularly in order to influence the optical properties, for instant in order to impart the desired coloration to the article according to the invention, at least one coloring oxide may be added to the material of the initial glass.

According to one embodiment of the invention, the material of the finished article or of the initial glass has the following components:

| | |
|---|---|
| $Li_2O$ | 2.5-5.5%, |
| $Na_2O$ | 0-3.0%, |
| $K_2O$ | 0-3.0%, |
| Ó$Na_2O$ + $K_2O$ | 0-4.0%, |
| MgO | 0-3.0%, |
| CaO | 0-2.5%, |
| SrO | 0-2%, |
| BaO | 0-3.5%, |
| ZnO | 0-3.5%, |
| $Al_2O_3$ | 18-27%, |
| $SiO_2$ | 52-75%, |
| $TiO_2$ | 1.0-5.5%, |
| $ZrO_2$ | 0-3.0%, |
| $SnO_2$ | <1.0%, |
| Ó$TiO_2$ + $ZrO_2$ + $SnO_2$ | 2.0-6.0%, |
| $P_2O_5$ | 0-8.0%. |

The quantity specifications are given as weight proportions in percent by weight. The summation sign "Ó" denotes the sum of the substance quantities of the components listed after the summation sign.

According to a second embodiment of the glass or glass ceramic article, its material has one of the following compositions:

| Glass 1 Component: | Proportion: | Glass 2 Component: | Proportion |
|---|---|---|---|
| $SiO_2$ | 63-67, preferably 65.5 | $SiO_2$ | 65-69, preferably 67.5 |
| $Al_2O_3$ | 22 to 24, preferably 23.2 | $Al_2O_3$ | 19 to 21, preferably 20 |
| $Li_2O$ | 2.5-4, preferably 3.3 | $Na_2O$ | 0-0.5, preferably 0.1 |
| $Na_2O$ | 0-0.5, preferably 0.4 | MgO | 0.5-1.5, preferably 1.1 |
| MgO | 0.2-0.8, preferably 0.5 | BaO | 0.5-1.5, preferably 0.9 |
| BaO | 0-0.5, preferably 0.05 | ZnO | 1.5-2, preferably 1.6 |
| ZnO | 0-0.5, preferably 0.05 | $ZrO_2$ | 1.5-2, preferably 1.8 |
| $ZrO_2$ | 2-2.5, preferably 2.2 | $TiO_2$ | 2-3, preferably 2.7 |
| $TiO_2$ | 1.5-2.5, | $As_2O_3$ | 0.5-1, |
| $As_2O_3$ | 1.0-2.5, preferably 2.09 preferably 1.13 | $K_2O$ | 0-0.5, preferably 0.81 preferably 0.2 |
| $P_2O_5$ | 0.5-1.5, preferably 1.3 | | |
| $K_2O$ | 0-0.5, preferably 0.3 | | |
| $V_2O_3$ | 0-0.1, preferably 0.03 | | |

The proportions in the table above are likewise given in percent by weight.

A dark coloration, as is often desired for hobs, may advantageously be achieved by a composition of the material of the article or the initial glass whose composition comprises from 0.02 to 0.6% by weight of $V_2O_5$. For a transparent article, correspondingly, a composition which is essentially free of $V_2O_5$ may advantageously be selected.

The composition of the initial glass wall the finally ceramized material may furthermore advantageously comprise at least one compound from a group which comprises Cr, Mn, Fe, Co, Cu, Ni, Se, Cl compounds. Such compounds are suitable in particular to support the coloration and adjust particular color loci.

According to one embodiment of the method according to the invention, the ceramization of the initial glass body comprises particularly clean electrical heating of the initial glass body, preferably in a levitation oven.

The levitation gas may also be purified, for example by means of a purifying filter, and thus kept as clean as possible in order to prevent the precipitation of extraneous substances and avoid a reduction in the strength due to this.

The levitation support may advantageously comprise at least one diaphragm with a continuous surface region and at least one gas feed chamber and at least one gas discharge chamber. These chambers are preferably arranged respectively below the gas feed and gas discharge regions. In this way, gas is supplied to the gas feed region via a gas feed chamber and forms a gas cushion between the continuous surface region and the initial glass body. On the other hand, excess gas can pass through the gas discharge region into a gas discharge chamber arranged underneath. The gas feed and gas discharge can be adjusted by setting up a suitable pressure gradient between the gas discharge chamber and the gas discharge region, are respectively between the gas feed chamber and the gas feed region. In order to achieve this, a pressure gradient may be set up in a straightforward way between the gas feed and gas discharge chambers. A suitably shaped diaphragm with chambers may, in particular, be produced by extrusion.

According to a preferred embodiment of the invention, the gas is fed to a perforated surface of the levitation support and discharged via feed and discharge channels. The surface of the levitation support may advantageously also comprise a porous material, through which gas for the gas cushion is fed or discharged. The levitation gas is transported by the air supply system through the diaphragm into the gas cushion, which is formed between the diaphragm and the glass plate. The pressure under the initial glass is stabilized by the air discharge system, which comprises in particular the gas discharge region and the gas discharge chamber. Owing to the gas film stabilized in this way, the initial glass body then flows over the diaphragm and is thus mounted contact-free.

The extruded diaphragm is perforated, so that a maximally homogeneous pressure profile is formed. This homogeneous pressure profile is advantageous in order to achieve a high planarity of the glass or glass ceramic articles produced according to the invention.

The desired temperature profile for the ceramization with as small as possible a temperature difference between the upper and lower sides of the glass, can advantageously be produced by temperature homogenization of the levitation gas taking place in the gas feed chambers of the extruded diaphragm. The initial glass body may be partially or fully mounted on the glass film during the ceramization process.

According to one embodiment of the method according to the invention, a particular chronological temperature profile is executed during the ceramization process. For this temperature profile, the initial glass body is first heated to a temperature T1. This temperature lies for example in a range of from 650 to 800° C. The body may be kept at this temperature for up to 4 hours, depending on the oven unit and the shape of the initial glass body. The body is subsequently heated further to a temperature T2 in a range of from 850 to 950° C. The body may then be kept at this temperature T2 for up to about 50 minutes. The body is subsequently cooled again to room temperature.

As well as flat glass ceramic plates, for example, glass or glass ceramic articles with a curved plate-like plate may also be produced according to the invention. To this end, the levitation support may have a curved surface. The initial glass body in the heated state can then be curved by gravitational sinking over the levitation support. It is advantageous in this case for levitation gas to be supplied during the curvature process, so that the curvature can take place contact-free. According to a refinement of the invention, the article has curvature along one direction, i.e. uniaxial curvature. Such an article may for example comprise a uniform curvature, so that it has the shape of a cylinder lateral surface segment. Nevertheless, the radius of curvature may also change along the surface. The production of such a shaped article may be carried out as described above, by gravitational sinking over a diaphragm which in this case is uniaxially curved.

The invention will be described in more detail below with reference to the appended figures. Parts which are the same and similar are provided with the same references in the figures.

FIG. 3 shows a refinement of the embodiment shown in FIGS. 1 and 2, FIGS. 4A and 4B show, with the aid of views of an embodiment of a device for carrying out the method according to the invention, the method steps for producing a curved glass or glass ceramic article.

Figure 1:
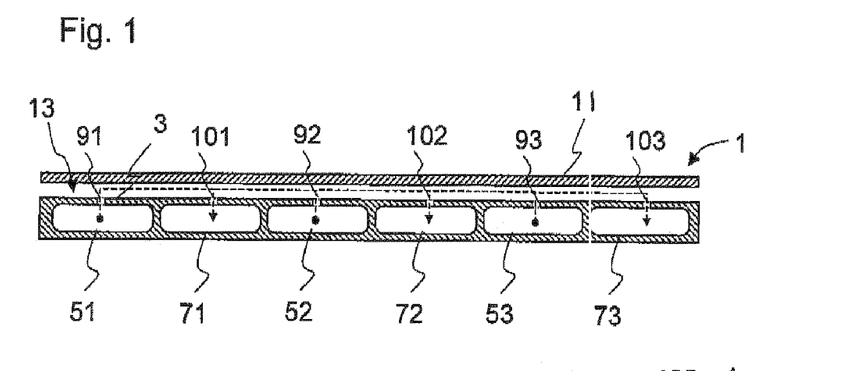
FIG. 1 shows a cross-sectional view through a levitation support of a device for carrying out the method according to the invention.

FIG. 1 represents a cross-sectional view of a levitation support in the form of a diaphragm denoted overall by 1. The diaphragm is preferably produced by extruding a suitable material, such as a refractory ceramic. The diaphragm 1 has a number of chambers 51, 52, 53, 71, 72, 73, which are arranged in the diaphragm below the continuous bearing surface 3 arranged on one side of the diaphragm. The chambers 51, 52, 53 are as gas feed chambers and the chambers 71, 72, 73 are used as gas discharge chambers for the levitation gas of the gas cushion, which is formed between an initial glass body to be ceramized and the continuous bearing surface 3 of the diaphragm by supplying the levitation gas via the chambers 51, 52, 53. For illustration, FIG. 1 shows an initial glass body 11, lying in levitation above the surface region 3 on a gas cushion or gas film 13, in the form of a plate which is plane on both sides.

The surface region 3 is perforated and has gas feed channels 91, 92, 93 and gas discharge channels 101, 102, 103 as perforations. The levitation gas is supplied and discharged via the gas feed channels 91, 92, 93 and gas discharge channels 101, 102, 103 which are in communication with the surface region 1 and the chambers 51, 52, 53 and 71, 72, 73. The gas flow direction is represented by arrows in FIG. 1. To this end a pressure difference is generated between the chambers 51, 52, 53 and 71, 72, 73, a high pressure being set up in the gas feed chambers 51, 52, 53 than in the gas discharge chambers 71, 72, 73. For the ceramization, the initial glass body may then for example be heated electrically in order to avoid precipitation. By a filter (not shown), the levitation gas may be purified before entering the gas feed chambers so that, for example, it is essentially free of suspended particles that may accumulate on the surface of the initial glass body in its softened state.

The levitation gas may advantageously be recycled by a corresponding instrument. To this end the gas is taken from the environment of the initial glass body 11, for instance an oven space in which the diaphragm is arranged, and fed back to the diaphragm 1 so as to achieve good temperature equilibration between the gas cushion and the environment of the levitationally mounted initial glass body 11.

The initial glass body 11 is mounted on the gas cushion 13 over the diaphragm 1 in particular whenever it shrinks or expands and/or has low viscosities, at which the initial glass body could otherwise adhere to the support. Shrinkage and growth processes take place particularly during the crystal growth. Levitational mounting during the crystal growth phase is also generally favorable for the quality of the articles produced according to the invention, since by mounting on the gas cushion it is possible to achieve a particularly homogeneous temperature distribution along the surface minimal temperature differences between the upper and lower sides of the glass body.

During the ceramization, the temperature of the levitation cushion is kept with a temperature gradient of less than 10° C., preferably less than 5° C., in the direction along the bearing surface of the levitation support. Particularly uniform ceramization is achieved by this uniform temperature distribution.

Figure 2:
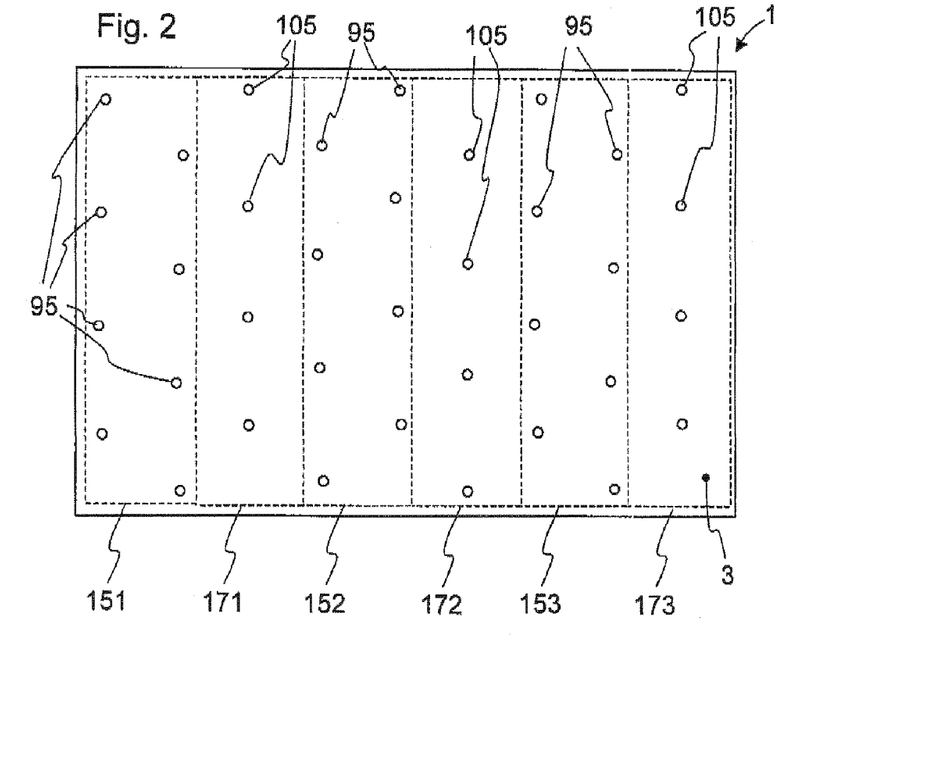
FIG. 2 shows a plan view of an embodiment of a levitation support.

FIG. 2 shows a plan view of the continuous surface of one embodiment of a levitation support 1 in the form of a diaphragm. The surface region 3 of the levitation support 1 has gas feed regions 151, 152, 153 at which levitation gas for the gas cushion is supplied, and gas discharge regions 171, 172, 173 at which gas from the gas cushion is at least partially discharged. The regions 151, 152, 153, 171, 172, 173 are marked by the dashed lines in FIG. 2. The gas is supplied via gas feed channels 95 arranged in the gas feed regions 151, 152, 153, and the gas is discharged via gas discharge channels 105 arranged in the gas discharge regions. For the sake of clarity, only a few of the channels 95 and 105 are labeled in FIG. 2. As represented in FIG. 1, the channels 95 and 105 are connected to chambers arranged below the surface region 3. In particular, the chambers 51-53, 71—are formed as closed channels which extend in the direction along the bearing surface on the inside of the diaphragm 3 below the gas feed and the gas discharge regions. The channels are also closed off at least partially from the bottom surface of the diaphragm 1, which lies opposite the bearing surface for the initial gas 11, so that there is a thermal barrier to the lower side of the diaphragm 1.

Figure 3:
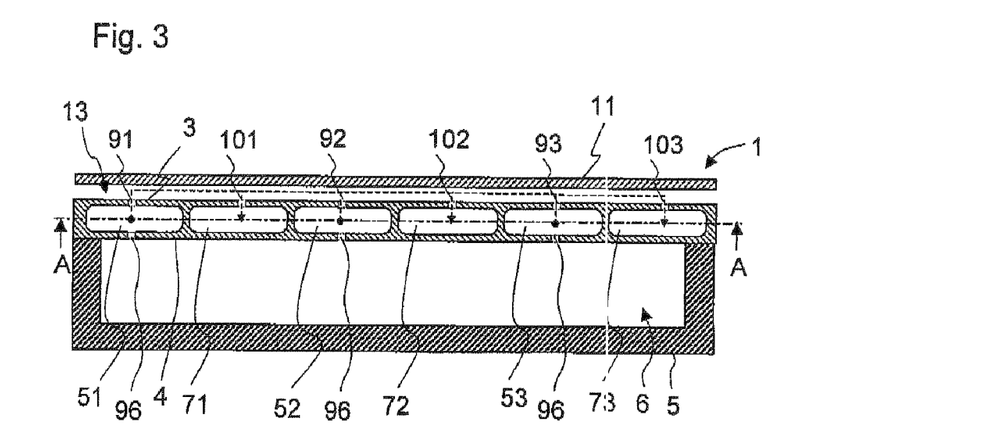

FIG. 3 represents a refinement of the invention, in which the gas is introduced into the gas feed chambers via an antechamber 6 arranged below the diaphragm 1. In this refinement of the invention as well, the gas feed chambers 51, 52, 53 are bounded at least partially at the bottom by a wall of the diaphragm 1. The gas feed chambers 51, 52, 53 respectively have downwardly directed gas-permeable connections in the form of channels 96 on the lower side or bottom surface 4, for supplying gas from the antechamber 6. The antechamber 6 is formed by an antechamber housing 5 attached to the bottom surface 4. The antechamber housing 5 is preferably made from ceramic material like the diaphragm 1, in order to avoid contamination of the levitation gas.

By means of the diaphragm according to the invention, as has been described by way of example with the aid of FIGS. 2 to 3, the glass or the glass ceramic 11 is kept by the levitation cushion at a height of at least 750 micrometers, preferably up to at most 2 millimeters, above the bearing surface.

Figure 4A:
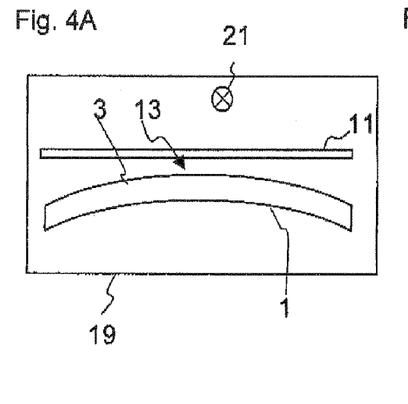
Figure 4B:
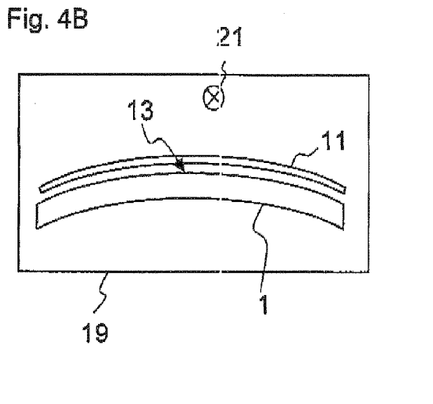
Figure 4C:
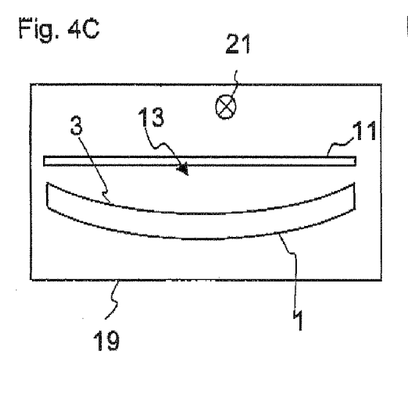
FIGS. 4C and 4D show with the aid of schematic views of another embodiment of a device for carrying out the method according to the invention, the method steps for producing a curved article.
Figure 4D:
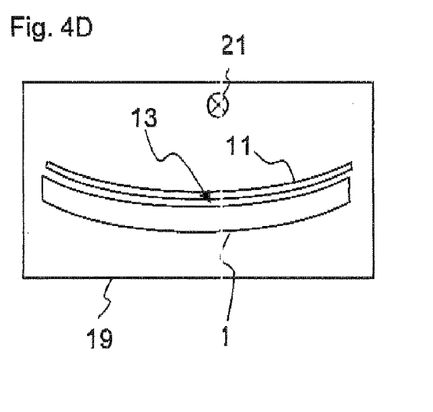

The method steps for producing a curved glass or glass ceramic article are represented in FIGS. 4A and 4B as well as 4C and 4D by way of example with the aid of a schematic views of two embodiments of a device for carrying out the method according to the invention. First, a plate-like initial glass body 11 is formed in the conventional way by molding. This is subsequently put into a levitation of an 19 with a levitation support arranged therein in the form of a diaphragm 1, so that the initial glass body 11 lies above the surface region 3 as represented in FIG. 4A. The diaphragm 1 is constructed similarly as represented in FIGS. 1 to 3. In contrast to the embodiments shown in FIGS. 1 to 3, the embodiment of the diaphragm 1 shown in FIGS. 4A to 4D has a curved surface region 3. This is represented a convexly curved surface region by way of example in FIGS. 4A and 4B. Concave curvature or a combination of convexly and concavely curved regions, for example as in a corrugated surface, are however likewise possible. FIGS. 4C and 4D show an embodiment with a concavely curved surface region.

In order to keep the initial glass body floating above the diaphragm 1, so as to avoid contact with the support 1, a gas cushion between the support and the initial glass body 11 is generated by gas supply via the gas feed regions of the surface region 3. Advantageously, the initial glass body may also be slightly laterally held or guided, in order to prevent the body from drifting away. Such holding or guiding requires only minimal holding forces during the levitational support. The points of contact with the holding or guiding instrument can therefore be kept very small, so that surface-wide ceramization of the initial glass body is achieved.

Subsequently, by means of an electrical heating device 21 arranged in the levitation oven, the initial glass body is heated until it softens. Owing to the force of gravity acting on the initial glass body, it likewise becomes curved, the regions of the initial glass body lying further away from the levitation support 1 sinking until an essentially homogeneous pressure distribution is produced by the gas cushion. This situation is shown by FIGS. 4B and 4D, respectively. The ceramization on the support 1 may be incorporated with the curving process or carried out subsequently. Particularly during the nucleation process, the glass generally becomes very soft and can easily be curved by gravitational sinking during this phase.

According to one embodiment of the invention, the diaphragm comprises a surface curved uniaxially, i.e. along one direction, so that glass ceramic articles correspondingly curved uniaxially are obtained.

The properties of glasses or glass ceramic articles produced according to the invention will be explained further by way of example below with the aid of application examples.

For a first plate-like article produced according to the invention with a thickness of 5 millimeters, the strength values achieved were on average with a breaking strength at a fall height of more than 140 centimeters. The composition of the glass ceramic material of this article corresponded to glass type 2. This value for a 5 mm thick glass plate exceeds by more than two times the values of 60 cm fall height, which are otherwise conventionally measured for non-prestressed glass ceramic plates of this thickness.

For another 3 millimeter thick plate-like glass ceramic article with a composition of the glass ceramic corresponding to glass type 1, an average breaking fall height of more than 80 cm was found. An average breaking fall height of at least 55 centimeter or 18 cm per millimeter thickness of the glass ceramic is readily achieved or even greatly exceeded, as shown by the example above, for plate-like glass ceramic articles produced according to the invention.

Here as well, the fall height achievable for the average breaking strength is about two times as great as the fall height of about 40 cm otherwise achievable with known glass ceramic articles.

The measured values are listed again more accurately in the following table.

| Glass system | Thickness [mm] | Fall height of the average breaking strength [cm] for glass ceramic produced according to the invention | Fall height of the average breaking strength [cm] for conventionally produced glass ceramic |
| --- | --- | --- | --- |
| Glass 1 | 3 mm | 87 | 40 |
| Glass 2 | 5 mm | 142 | 63 |

With the aid of this table, it is clear that the plates produced according to the invention achieve a significantly higher strength owing to the novel method of ceramization on a levitation support with a continuous surface and gas feed and gas discharge regions and the high pressure homogeneity thereby achieved in the gas cushion and the uniform temperature distribution in the initial glass body. The measurement values indicated were achieved without additional chemical prestressing.

Figure 5:
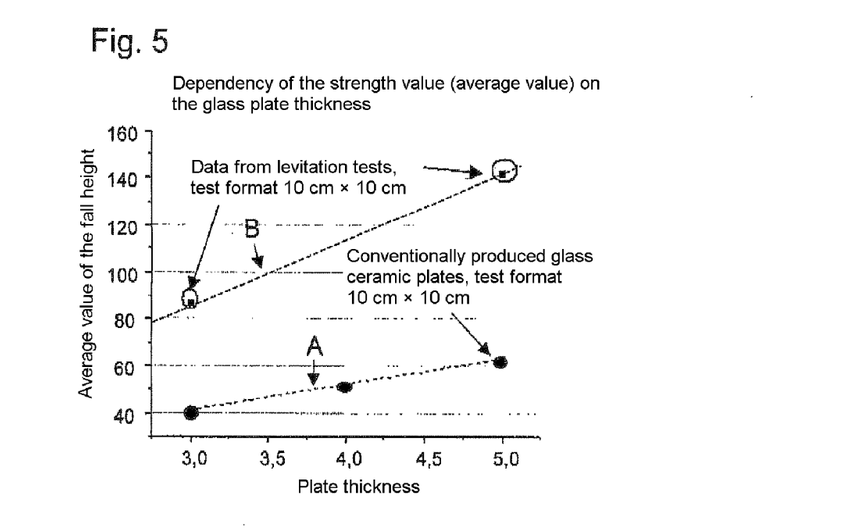
FIG. 5 shows the dependency of the average breaking fall height on the thickness of glass ceramic articles.

Reference will be made below to FIG. 5, which shows the dependency of the average breaking fall height of the thick glass ceramic articles with the aid of measured values. Conventionally produced glass ceramic plates and glass ceramic articles according to the invention are respectively represented. With the aid of this diagram, it is again clear that in terms of strength a glass ceramic article produced according to the invention far surpasses a glass ceramic article ceramized conventionally while resting on a support and in contact with the support.

With the aid of the measurement values of the conventionally produced plates and FIG. 5, the linear correlation of the plate thickness with the average breaking fall height can also be seen. Thus, according to this linear relation, the conventionally produced glass ceramic plates tested have an average breaking fall height of about 12.5 cm per millimeter of plate thickness, corresponding to the straight line denoted by "A". Conversely, the measurement values shown in the FIG. 5 for the tested glass ceramic plates according to the invention showed an average breaking fall height of about 28.5 cm per millimeter of plate thickness. These achieved strength values lie above the minimum values achievable by their production method according to the invention, namely 15, 18, 20 or 25 centimeters average breaking fall height per millimeter of plate thickness. The plates for the dropping test were ceramized in an experimental arrangement. The temperature homogeneity and the homogeneity of the pressure profile can be improved further in an industrial application, so that average breaking fall heights of 30 cm per millimeter of plate thickness or even more are possible.

The considerably increased strength of plates produced according to the invention was demonstrated in the exemplary embodiments with the plate thicknesses 3 mm and 5 mm. It is clear to the person skilled in the art that plates produced according to the invention with a different plate thickness, for example between 3 mm and 5 mm, also have a correspondingly increased strength. The increased to strength of plates produced according to the invention with thicknesses of between 3 mm and 5 mm can be interpolated with the aid of relevant literature. (See for example: J. L. Glathart, F. W. Preston: "The behaviour of glass under impact"; in: Glass Technology, 1968). Accordingly, for plate thicknesses of between 3 mm and 5 mm, increased strengths are obtained which can be interpolated linearly from the strength values of the exemplary embodiments.

It is clear to the person skilled in the art that the invention is not restricted to the exemplary embodiments described above, but may be modified in a variety of ways. In particular, the features of the individual exemplary embodiments may also be combined with one another.

The invention claimed is:

1. A method for producing glass ceramic articles, comprising:
   producing an initial glass body (11), wherein the production of the initial glass body (11) comprises fining the initial glass body with a fining agent that is also found in the glass ceramic articles after ceramization, and wherein fining the initial glass body results in a substantially bubble-free initial glass body,
   mounting the initial glass body (11) on a gas cushion (13), wherein the gas cushion is between a levitation support (1) and the initial glass body (11), and
   at least partially ceramizing the initial glass body (11) on the levitation support (1),
   wherein the levitation support has at least one diaphragm with a continuous surface region (3) with at least one gas feed region (151, 152, 153) where levitation gas for the gas cushion (13) is fed out from the levitation support, and at least one gas discharge region (171 172, 173) where gas from the gas cushion (13) is at least partially discharged into the levitation support,
   wherein the levitation gas is supplied via a gas feed chamber (51-53) and discharged via a gas discharge chamber (71-73), which respectively comprise closed channels that extend in a direction along a bearing surface inside the levitation support, and
   wherein the levitation gas is supplied through an antechamber (6) arranged below the levitation support (1) to the gas feed chamber (51-53) via a gas-permeable connection in the form of a channel (96) provided on the lower side of the pas feed chamber (51, 52, 53) and having a cross section, which in comparison with the gas feed chamber (51-53) is smaller.

2. The method as claimed in claim 1, wherein the levitation gas in the gas feed chamber (51-53) and the gas discharge chamber flows in the diaphragm or levitation support normal to the direction along the bearing surface.

3. The method as claimed in claim 1, wherein the levitation gas experiences a pressure drop of at most 0.5 mbar when flowing through the gas discharge chamber (71-73).

4. The method as claimed in claim 1, wherein the at least partial ceramization of the initial glass comprises nucleation.

5. The method as claimed in claim 1, wherein a pressure gradient is set up between a gas feed chamber (51, 52, 53) and a gas discharge chamber (71, 72, 73).

6. The method as claimed in claim 1, wherein the ceramization of the initial glass body (11) comprises electrical heating of the initial glass body.

7. The method as claimed in claim 1, wherein the ceramization of the initial glass body (11) comprises:
   heating the initial glass body to a temperature T1 in a range of from 650 to 800° C.,
   heating to a temperature T2 in a range of from 850 to 950° C., and
   cooling to room temperature.

8. The method as claimed in claim 7, wherein after heating to the temperature T1, the initial glass body (11) is kept at this temperature for a duration of up to 4 hours.

9. The method as claimed in claim 7, wherein after heating to a temperature T2, the initial glass body (11) is kept at this temperature for a duration of up to 50 minutes.

10. The method as claimed in claim 1, wherein the production of the initial glass body (11) comprises the separation of sections from an initial glass web.

11. The method as claimed in claim 1, wherein the initial glass body (11) is produced in the form of a glass plate which is plane on both sides.

12. The method as claimed in claim 1, wherein the initial glass body is produced in the form of a glass plate which is knopped on one side.

13. The method as claimed in claim 12, wherein a knopped structure is impressed via a knopped roller onto one side of a preliminary glass web during molding.

14. The method as claimed in claim 1, wherein the levitation gas is purified.

15. The method as claimed in claim 1, the levitation support (1) having a curved surface, wherein the initial glass body (11) in the heated state is curved by gravitational sinking over the levitation support (1).

16. The method as claimed in claim 1, wherein the initial glass body (11) is curved uniaxially.

17. The method as claimed in claim 1, wherein the initial glass body (11) is mounted levitating on the gas cushion while the initial glass body (11) shrinks or expands.

18. The method as claimed in claim 1, wherein the initial glass body (11) is ceramized surface-wide.

19. The method as claimed in claim 1, wherein the temperature of the gas cushion is kept with a temperature gradient of less than 10° C. in the direction along the bearing surface of the levitation support.

20. The method as claimed in claim 1, wherein the glass ceramic (11) is kept at a height of at least 750 micrometers above the bearing surface of the levitation support by the gas cushion.

21. The method as claimed in claim 1, wherein the levitation gas is already heated upon entering the gas feed chamber as a result of re-circulating gas from an oven space in which the levitation support is arranged.

22. The method as claimed in claim 1, wherein the levitation gas is at least partially recirculated.

* * * * *

UNITED STATES PATENT AND TRADEMARK OFFICE
CERTIFICATE OF CORRECTION

PATENT NO. : 8,516,851 B2  Page 1 of 1
APPLICATION NO. : 11/720915
DATED : August 27, 2013
INVENTOR(S) : Nuettgens et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1331 days.

Signed and Sealed this
Fifteenth Day of September, 2015

Michelle K. Lee
*Director of the United States Patent and Trademark Office*